United States Patent [19]

Nohr et al.

[11] Patent Number: 5,794,975
[45] Date of Patent: Aug. 18, 1998

[54] MOTOR VEHICLE IMPACT PASSENGER PROTECTION ARRANGEMENT

[75] Inventors: Matthias Nohr, Stuttgart; Herbert Mehren, Goldtaeleweg, both of Germany

[73] Assignee: Daimler-Benz AG, Germany

[21] Appl. No.: 789,014

[22] Filed: Jan. 27, 1997

[30] Foreign Application Priority Data

Jan. 25, 1996 [DE] Germany ............ 196 02 600.8
Dec. 27, 1996 [DE] Germany ............ 196 54 447.5

[51] Int. Cl.⁶ ............................................. B60R 21/04
[52] U.S. Cl. .......................... 280/753; 280/748; 280/751; 280/752
[58] Field of Search ...................... 280/729, 753, 280/751, 752, 748, 741, 728.1, 728.3, 730.1, 730.2

[56] References Cited

U.S. PATENT DOCUMENTS 3,756,621  9/1973  Lewis et al. .................. 280/741
5,141,279  8/1992  Weller .......................... 280/751
5,382,051  1/1995  Glance .......................... 280/753
5,480,184  1/1996  Young .......................... 280/751

FOREIGN PATENT DOCUMENTS 2 272 866  12/1975  France.
27 11 338  3/1977  Germany.

*Primary Examiner*—Eric D. Culbreth
*Attorney, Agent, or Firm*—Evenson, McKeown, Edwards & Lenahan, P.L.L.C.

[57] ABSTRACT

A motor vehicle impact protection arrangement protects persons and has an impact protection device which is rendered operative in a defined protection area only when the danger of an impact is signalled. An energy-absorbing material is provided so that, when a danger of an impact has not yet been signalled, the material is situated in a closed space below the impact protection area and emerges only when the danger of an impact is signalled as an energy-absorbing impact protection device in the defined impact protection area.

3 Claims, 2 Drawing Sheets

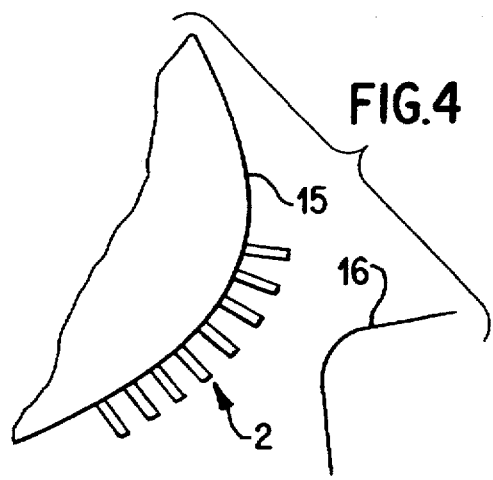
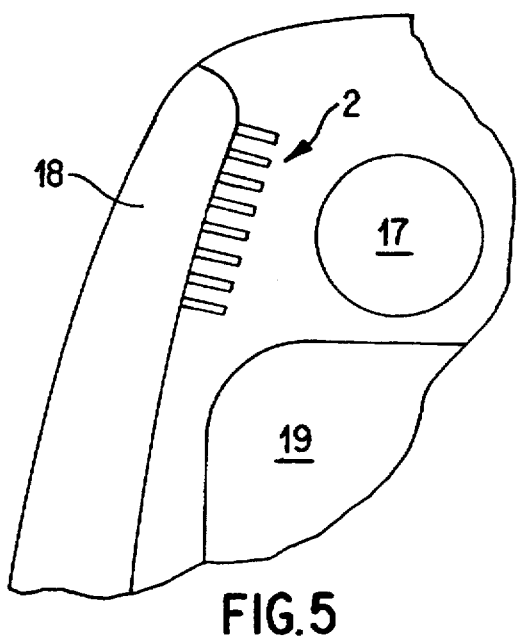
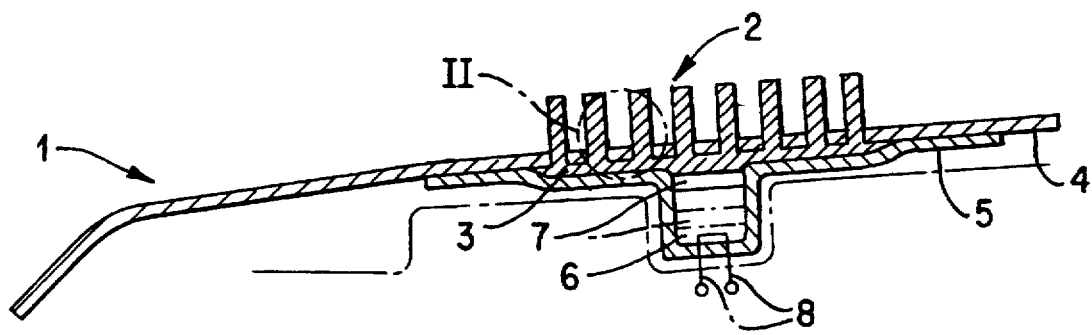
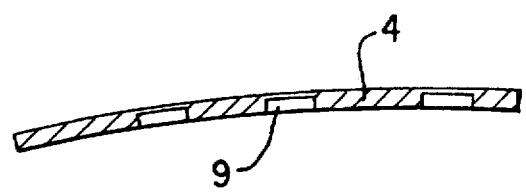

5,794,975

MOTOR VEHICLE IMPACT PASSENGER PROTECTION ARRANGEMENT

BACKGROUND AND SUMMARY OF THE INVENTION

The present invention relates to a motor vehicle impact protection arrangement for protecting persons, and more particularly, to an arrangement with an impact protection device which is rendered operative in a defined protective area only in a situation involving a signalled impact danger.

One of the common forms for vehicle occupant protection is an inflatable air bag. DE 27 11 338 A1 shows an air bag between the front opening hood of a vehicle and the adjoining windshield as an active impact protection device for a pedestrian hit by the vehicle. In a collision between a vehicle equipped in this manner and a pedestrian, the air bag is activated by a sensor detecting the impact. That is, the bag is supplied with air, whereby it can emerge from the gap between the front opening hood and the windshield as an impact protection cushion.

For reducing the risk of injury to a pedestrian hit by a vehicle, FR 2 272 866 A provides a protecting cushion in the area of the front opening hood of a vehicle which moves out of the front opening hood as the result of the pedestrian's impact on the vehicle. This protecting cushion is, however, used less as an impact protection device than a way for catching a person thrown onto the front opening hood during a collision with a vehicle.

An object of the present invention is to provide an impact protection which is not actively built up until there is a concrete signalled impact danger. In this event, special attention is paid to the fact that the impact protection arrangement is provided on a thin wall so that, in the non-activated condition, it will be absolutely invisible from one side of this wall. This arrangement applies particularly, for example, to the use as an impact protection device on the front opening hood of a vehicle for protecting persons.

This object has been achieved in accordance with the present invention by providing that an energy-absorbing material which, when prior to the signalled impact danger is arranged in a closed space covered by the defined protection area, at least one of openings and predetermined weak points provided in the defined protection area and configured to be broken open or deformed by pressure exercised by the energy-absorptive material, through or into which, respectively, the energy-absorbing material emerges after the signalled impact danger and form an energy-absorbing elevation, and a pressure generator configured to be actuatable by an impact signal and is arranged relative to the energy-absorbing material so that, in an actuated state, the pressure generator exercises pressure on the energy-absorbing material to cause the energy-absorbing material to move to the energy-absorbing elevation.

The present invention is based on the recognition that a high energy-absorbing material should be provided in a closed space below the area to be protected from an impact so that, when an impact danger is signalled, the material is subjected to such a pressure that, in the impact protection area, it first automatically opens up covered openings and emerges therefrom in order to form an energy-absorbing protective cushion.

Portions of an energy-absorbing basic body made of a foamed material can also be pressed out through the openings in the protection area when, after a vehicle impact has taken place, pressure is exerted on this foamed material.

In the closed space, below openings arranged in the protection area and each covered by a thin membrane, a highly expandable foil can be provided which has molded-in naps situated in the area of the openings. A fluid, a plastic foam or a flowable plastic material may be provided between such a highly expandable foil and a pressure generator for the protection arrangement. During the activation of the pressure generator, the naps of the foil are pressed by the filler material in the closed space through the openings of the protection area to the outside and there form highly energy-absorbing elevations.

BRIEF DESCRIPTION OF THE DRAWINGS

These and other objects, features and advantages of the present invention will become more readily apparent from the following detailed description thereof when taken in conjunction with the accompanying drawings wherein:

FIG. 4 is a schematic view of a section of a dashboard cover having a knee impact protection device in a vehicle passenger;

FIG. 5 is a schematic view of the upper area of a center door pillar of a vehicle having a head impact protection device in the vehicle passenger compartment;

FIG. 6 is a cross-sectional view of an engine hood with a triggered impact protection arrangement and an indicated drive assembly; and FIG. 7 is an enlarged cutout from circled area II of FIG. 1 in the ready position.

DETAILED DESCRIPTION OF THE DRAWINGS

Figure 1:
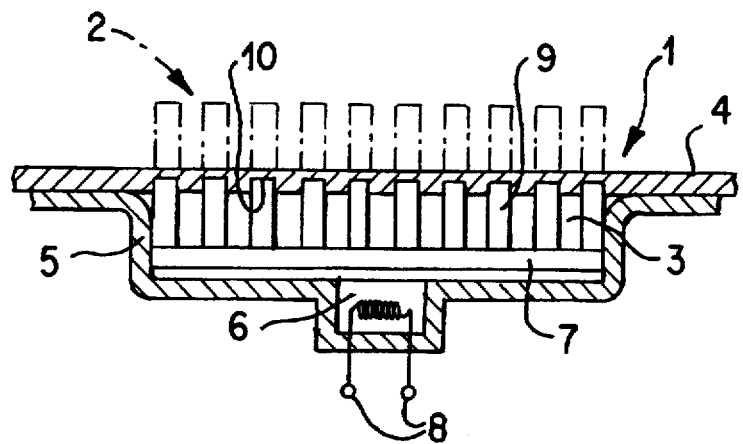
FIG. 1 is a cross-sectional view of the engine hood of a vehicle having an impact protection arrangement with energy-absorbing elevations which are pushed out from a hidden position shown in solid line in a pin-like manner as seen in dot-dash line.
Figure 2:
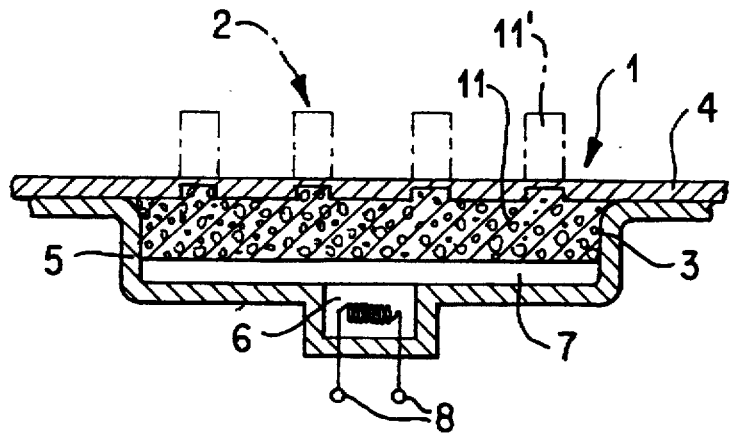
FIG. 2 is a cross-sectional view of a portion of an impact protection arrangement according to FIG. 1 with a compact foamed-material part as the basic body as an energy absorbing material.
Figure 3:
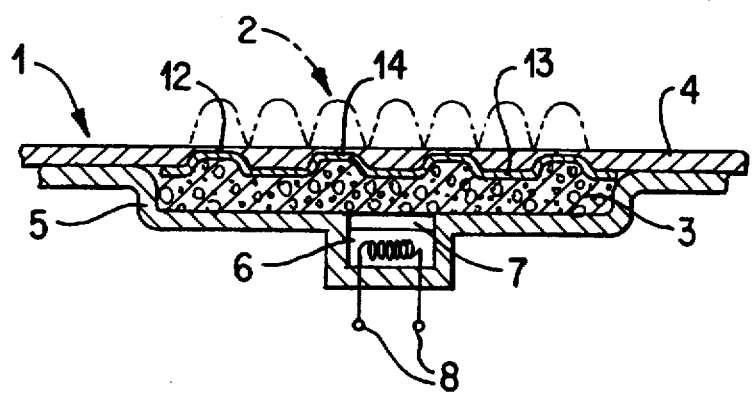
FIG. 3 is a cross-sectional view of an impact protection arrangement according to FIG. 1 with energy-absorbing naps pushed onto the surface of the protection area in the manner indicated by the dot-dash lines.

A pedestrian impact protection arrangement 2 is integrated in an engine hood 1 according to the embodiments of FIGS. 1 to 3. In each embodiment, the protection arrangement has a closed space 3 which, on one hand, includes the metal plate 4 of the engine hood 1 and, on the other hand, a dish 5 which is fixedly and tightly connected with this metal plate, as the boundary walls. A blasting chamber 6 is situated in the bottom of the dish 5, the chamber being separated with respect to the interior of the reservoir 3 by a movable piston 7. The blasting chamber 6 can be ignited by a conventional signal generator (not shown) via the contacts 8. The signal generator, in turn, is activated by a sensor which directly senses the danger of the impact of a pedestrian or such an impact itself in a known manner.

In the embodiment according to FIG. 1, pins 9 made of an energy-absorbing material are situated inside the closed space 3 as shown by solid lines. Within the impact protection area of the engine hood 1, under which the filled closed space is situated, a plurality of molded-in cups 10 in the form of blind-hole bores molded, for example, into a thin vehicle wall are situated in the bottom side of the metal plate 4. The bottoms of the cups 10 are so thin that, in the case of a pressure exercised on the piston 7 by an ignited blasting chamber 6, they are opened up by the pins 9 which emerge to the dot-dash line position as impact protection devices. This results in a protective shield on the engine hood in the form of spikes. Naturally, other shapes of an impact protection shield building up on the engine hood are also within the scope of the present invention. This applies particularly to the use of an impact protection device which exists as a foamed material 11 inside the closed space 3, which foamed material 11 forms energy-absorbing foamed-material pins 11' when it emerges through the pushed-open openings of the protection area.

The embodiment of FIG. 2 is similar to that of FIG. 1 except that instead of the pins 9 inside the closed space 3, a viscous elastic flowable mass 11 is provided therein. A plurality of molded-in cups in the form of blind-hole bores is situated on the bottom side of the metal plate 4. The bottoms of the cups are so thin that, with pressure exercised on the mass 11 by the piston 7 extending across the closed space 3 by an ignited blasting chamber 6, the cup bottoms open up and the mass 11 emerges through the formed opening in the shape of pins 11' shown in dot-dash line to provide impact protection in the form of spikes on the vehicle hood or in the vehicle interior.

In the embodiment of FIG. 3, openings are provided in the protection area which are covered by a thin membrane 12. In the closed space 3 situated underneath the thin membrane 12, a highly expandable foil 13 is mounted which is preformed into naps 14 which come to rest below the openings. A fluid, a plastic foam or a flowable plastic material is situated between the piston 7 covering the blasting chamber 6 and the foil 13. When the blasting chamber 6 is ignited via the contacts 8 and conventional signal generator, this fluid, foam or material presses the highly energy-absorbing naps 14 through the thin outside membrane 12 to the dot-dash position.

A pedestrian impact protection arrangement 2 is integrated in an engine hood 1 according to FIG. 6.

This protection arrangement consists of a reservoir or closed space 3 which, on one hand, consists of the metal plate 4 of the engine hood 1 and, on the other hand, consists of a dish 5 which is fixedly and tightly connected with this metal plate, as the boundary walls. In the bottom of the dish 5, a blasting chamber 6 is situated which is separated with respect to the interior of the reservoir 3 by way of a movable piston 7. Contacts 8 connected with a signal generator ignite the blasting chamber 6. The signal generator, in turn, is activated by a sensor which directly senses the danger of the impact of a pedestrian or such an impact.

A viscous elastic flowable mass is situated inside the reservoir 3. Within the impact protection area of the engine hood 1, to which the reservoir 3 is assigned, a plurality of molded-in cups 10 in the form of blind-hole bores are situated in the bottom side of the engine hood 1. The bottoms of the cups 10 are so thin that, in the case of a pressure exercised on the viscous mass in the reservoir 3 by an ignited blasting chamber, they open up automatically, whereby the viscous elastic mass can emerge through the formed openings in the shape of pins as an impact protection device. This results in a protective device in the form of spikes on the engine hood 4 in the same manner similar to FIG. 2. Other shapes of an impact protection device emerging above on the engine hood are also within the scope of the present invention. This applies particularly to the use of an impact protection medium which is liquid inside the reservoir 3 and is foamed to form an elastic body when it emerges onto the surface of the engine hood.

In FIG. 1, the vehicle drive assembly under the engine hood is indicated by a dash-dotted line. As illustrated, the engine hood 4 rests relatively closely on the drive assembly which forms an essentially rigid unit so that, because of the lack of available space, an impact protection cannot take place to any significant extent only by a deformation of the metal plate. The providing of a special impact protection device according to the invention is therefore particularly important in such cases.

FIGS. 4 and 5 are schematic views of applications for the impact protection arrangement in the passenger compartment. The embodiment according to FIG. 4 is a knee protection device within a dashboard cover 15 for protecting a knee 16 against an impact. The embodiment according to FIG. 5 is a protection for the head 17 of the driver or front seat passenger by way of an impact protection arrangement according to the present invention in the center pillar 18 between the doors on the side of a vehicle. Reference number 19 indicates the backrest of the driver's or passenger's seat from the rear.

Instead of the respective piston 7 shown in FIGS. 1–3, a shape memory metal may be provided in virtually the same form, whereby its contour is changed by the application of an electric voltage. As a result, a pressure can be exercised on the material filling in the space 3 in the same manner as the pyrotechnically movable piston 7.

The significant advantages of the present invention consist of a simple construction of an impact protection arrangement, of a particularly high energy absorption capacity of the impact protection device of this arrangement as well as of an extremely low space requirement for such an arrangement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle impact protection arrangement which is rendered operative in a defined protection area only in an event of a signalled impact danger of an impact, comprising an energy-absorbing material which, when prior to the signalled impact danger is arranged in a closed space covered by the defined protection area, at least one of openings and predetermined weak points provided in the defined protection area and configured to be broken open or deformed by pressure exercised by the energy-absorbing material, through or into which the energy-absorbing material emerges after the signalled impact danger and form an energy-absorbing elevation, and a pressure generator configured to be actuatable by an impact signal and arranged relative to the energy-absorbing material so that, in an actuated state, the pressure generator exercises pressure on the energy-absorbing material to cause the energy-absorbing material to emerge to the energy-absorbing elevation wherein the predetermined weak points are configured as cups one of formed and molded on one side into a thin wall of a vehicle.

2. The arrangement according claim 1, wherein the emerging material has a spiked structure at the energy-absorbing elevation.

3. The arrangement according to claim 1, wherein the pressure generator is a pyrotechnically operating pressure generator.

* * * * *